(No Model.)
T. A. KELLETT.
OVEN.
No. 257,018. Patented Apr. 25, 1882.
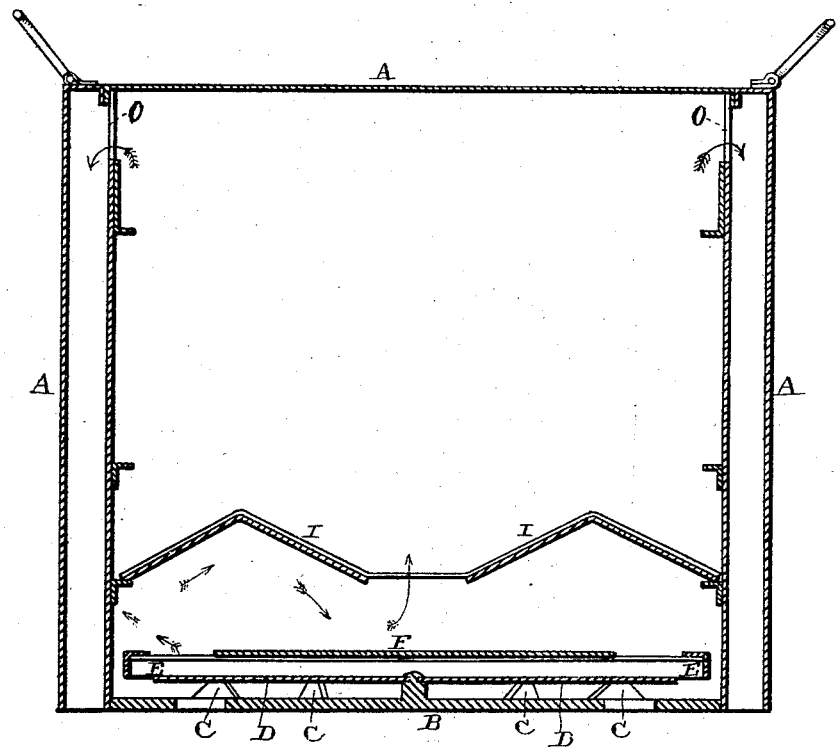
Witnesses:
William W. Mortimer
Wm. H. Kern
Inventor:
T. A. Kellett,
per
F. A. Lehmann,
atty

UNITED STATES PATENT OFFICE.

THOMAS A. KELLETT, OF LAPORTE CITY, IOWA.

OVEN.

SPECIFICATION forming part of Letters Patent No. 257,018, dated April 25, 1882.

Application filed November 3, 1881. (No model.)

*To all whom it may concern:*

Be it known that I, THOS. A. KELLETT, of Laporte City, in the county of Black Hawk and State of Iowa, have invented certain new and useful Improvements in Ovens; and I do hereby declare the following to be a full, clear, and exact description of the invention, such as will enable others skilled in the art to which it pertains to make and use it, reference being had to the accompanying drawings, which form part of this specification.

My invention relates to an improvement in ovens that is designed especially to be used in connection with lamp stoves or heaters, but which may be used in connection with other sources of heat; and it consists, first, in a slide having an opening through its center for the passage of air, and having each of its ends made V-shaped, so as to deflect the rising heat downward upon the article being baked; second, in an oven having suitable openings through its bottom and provided with a plate placed immediately over the openings, and a grate which has a second plate attached to it for the purpose of preventing the article that is being baked from being overheated; third, in the arrangement and combination of parts which will be more fully described hereinafter.

The object of my invention has been to provide a means by which the heated air shall be deflected downward upon the top of the article being baked, so that it will be baked as thoroughly upon the top as any other part.

The accompanying drawing represents a vertical section of my invention.

A represents the oven, which may be of any desired shape or size, and which has for its bottom a perforated iron casting, B, while its upper portion is made from any suitable sheet-iron. Upon the top of this casting B, around the openings made through it for the admission of the heated air, are suitable projections C, upon the top of which is placed the flat plate or disk D, made preferably of sheet-iron. Upon the top of this plate D is placed a grate, E, and upon the top of this grate is secured a second sheet-iron plate, F, of smaller size. These two plates serve to prevent the heated air from rising up in direct contact with the article that is being baked, and thus overheating it or burning it. As the air is deflected toward the sides of the oven as it rises upward, it will readily be seen that it at once fills the baking-space, and thus acts upon the article on all sides at once.

In order to prevent the heated air from rising directly into the top of the oven and escaping before it has had its full effect upon the article that is being baked, a slide, I, having a slit or opening through its center is used. This slide consists of two sheets of sheet metal, which are joined together by suitable metallic connections, and both of these plates or sheets of metal are made V-shaped, as shown, so as to catch the rising air and deflect it downward upon the article that is being baked. Where a small flat slide is used the air is not deflected downward, nor held, as is here shown, but escapes freely through the slot at the center of the slide, and then escapes into the hot-air chamber above, and from this chamber it passes through the flues and escapes.

The article to be baked has to be placed upon the plate F upon the grate, and if it is a thin article—such as a pie—the slide will be placed upon the first pair of supports, which are secured to the sides of the oven just above it, and the heated air, striking against the V-shaped plates, will be deflected down upon the top of the pie, so as to bake it perfectly at this point before it escapes. If the article to be baked consists of biscuits or things of that height, the slide will be placed upon the second set of supports, while if the article to be baked is of considerable height the slide will be placed upon the supports in the top of the oven. The hot air, after passing through the slide, first fills the top part of the oven, and then it slowly escapes through the two side flues, *o*, into the open air. These flues extend down the sides of the oven and serve to keep it constantly hot, and thus much less heat is required to do the baking.

Having thus described my invention, I claim—

1. A slide for ovens consisting of two V-shaped surfaces, which have a suitable opening between them for the escape of the heated air, substantially as shown.

2. In a bake-oven, the combination of the base B, having suitable openings through it, and provided with the projections C, with a sheet-iron plate that is placed upon the projections, and a grate which is provided with a second plate for the article being baked to rest upon, substantially as described.

3. In a bake-oven, the combination of the perforated base having a sheet-metal base placed above it, a grate provided with a second plate, a slide having its surface formed into two or more V shapes, and suitable flues for carrying off the hot air from the oven, substantially as set forth.

In testimony whereof I affix my signature in presence of two witnesses.

THOMAS ADAM KELLETT.

Witnesses:
 CHAS. A. BISHOP,
 CATO SELLS.